Oct. 9, 1928.
P. M. FREER
1,687,286
LIQUID FLOW REGULATOR
Filed Nov. 15, 1926
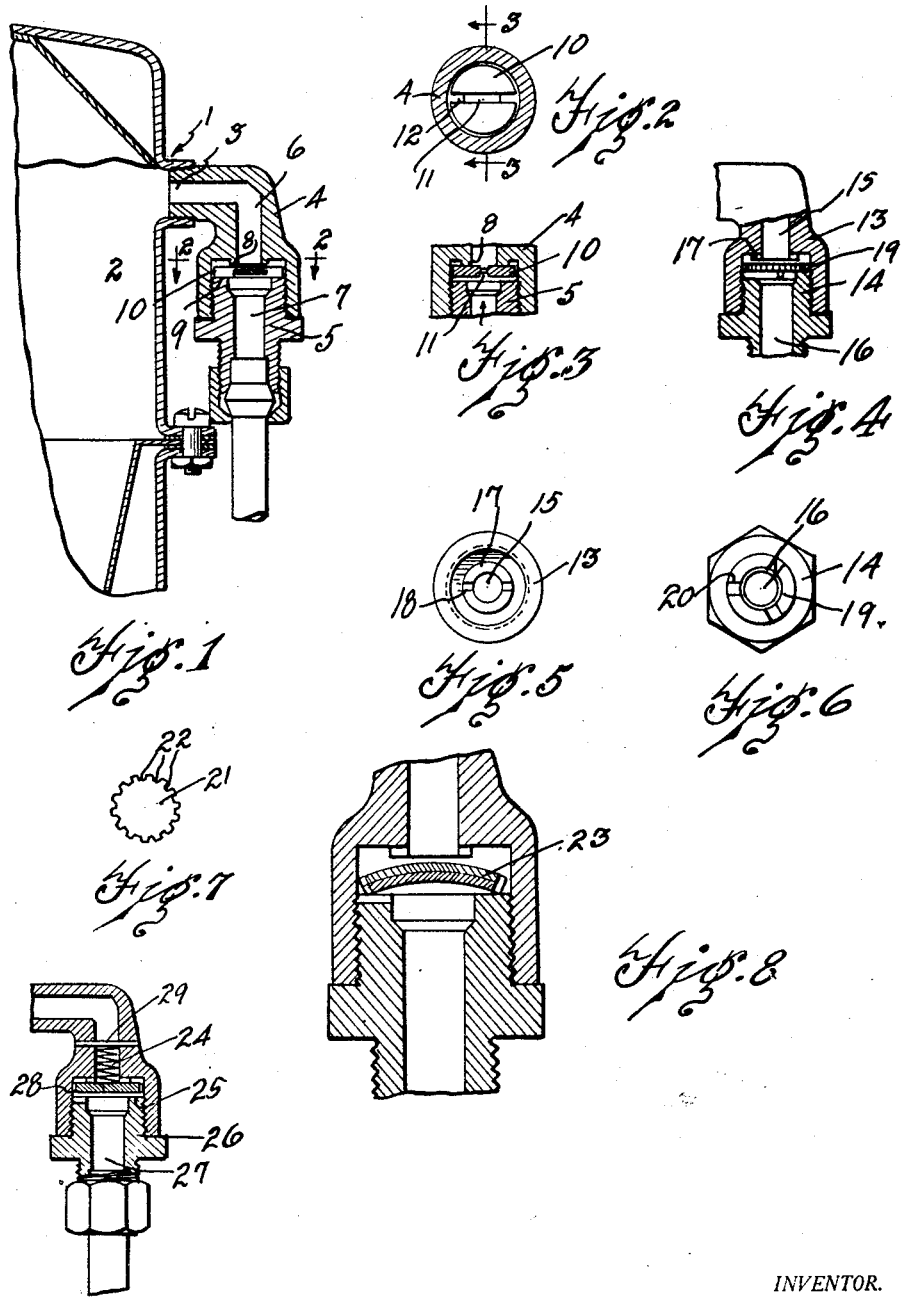
INVENTOR.
PHELPS M. FREER
BY
ATTORNEY.

Patented Oct. 9, 1928.

1,687,286

UNITED STATES PATENT OFFICE.

PHELPS M. FREER, OF DETROIT, MICHIGAN.

LIQUID-FLOW REGULATOR.

Application filed November 15, 1926. Serial No. 148,536.

The invention relates to liquid flow regulators and refers more particularly to regulators for controlling the flow of oil which may be used in connection with apparatus for lubricating various parts or apparatus for purifying used lubricating oil such as rectifiers or the like. One of the objects of the invention is to provide a regulator with means for automatically freeing a restricted passageway of sediment. Another object is to provide a regulator the parts of which may be cheaply and economically manufactured and may cooperate to form a restricted passageway upon flow of the liquid in one direction and to allow return of the liquid upon stopping of the propelling means for the liquid. With these as well as other objects in view, the invention resides in the novel features of construction and combinations and arrangements of parts as more fully hereinafter set forth.

In the drawings:—

Figure 1 is a sectional view through a portion of an apparatus embodying my invention;

Figure 2 is a cross section on the line 2—2 of Figure 1;

Figure 3 is a cross section on the line 3—3 of Figure 2;

Figure 4 is a view similar to Figure 1, showing a modified construction;

Figures 5 and 6 are plan views of the adjacent ends of the cooperating members of the regulator;

Figure 7 is a plan view of the regulator valve;

Figures 8 and 9 are views similar to Figure 1 and showing other modified constructions.

The liquid flow regulator, as shown in the present instance, is designed to regulate the flow of lubricating oil and furthermore is specifically shown as applied to an apparatus for purifying used lubricating oil. As shown in Figures 1, 2 and 3, 1 is the apparatus for purifying used lubricating oil having the oil receiving chamber 2 and the oil inlet 3. The oil flow regulator is designed to control the flow of oil passing through this inlet and comprises the upper and lower cooperating members 4 and 5, respectively, with the upper end of the latter threaded into the enlarged internally threaded flange at the lower end of the former. These members respectively have the oil passageways 6 and 7 therethrough with the oil passageway 7 in axial alignment with a portion of the oil passageway 6. The portion of the member 4 surrounding the lower end of the oil passageway 6 is formed with the annular seat 8 which is spaced from the annular seat 9 at the upper end of the member 5 this latter seat surrounding the upper end of the oil passageway 7 which is of greater diameter than the lower end of the oil passageway 6. 10 is a valve in the nature of a disc located between the annular seats 8 and 9 and having a certain amount of vertical movement relative thereto. This valve has the diametrical channel 11 in its upper face of a length at least equal to and preferably greater than the diameter of the lower end of the oil passageway 6. This valve also has the transverse slots 12 therethrough and at the end of the channel, the arrangement being such that when the valve is in its uppermost position and seated against the annular seat 8 oil may flow upwardly through the oil passageway 7, the slots 12 in the valve, the diametrical channel 11 in the valve and the oil passageway 6 to the oil inlet 3. Also when the valve is in its lowermost position and seated upon the annular seat 9 any oil in the oil passageway 6 may return by flowing over the upper surface of the valve through the slots 12 in the valve and into the oil passageway 7. In operation and with the valve in its lowermost position and seated upon the annular seat 9, when oil is forced through the oil passageway 7 it temporarily flows through the slots 12 in the valve and over the upper face of the valve freeing the channel 11 in the upper face of the valve of sediment, as well as freeing the annular seat 8 of sediment. Then the valve is carried upwardly into engagement with the annular seat 8 and the oil flow is restricted by reason of the oil passing through the channel 11 in the valve to the oil passageway 6. Upon stopping the mechanism propelling the oil, the valve lowers and permits oil in the upper member to return through the slots 12 in the valve to the oil passageway in the lower mechanism.

For the purpose of permitting assembling the valve between the cooperating members with either side uppermost, both sides of the valve are made alike, that is both sides of the valve have diametrical channels therein.

In the modification shown in Figures 4 to 7, inclusive, the oil flow regulator is formed of cooperating upper and lower members 13 and 14, respectively, having oil passageways 15 and 16, respectively, therethrough with the upper end of the passageway 16 of greater diameter than the lower end of the passageway 15. The portion of the upper member 13 surrounds the lower end of the passageway 15 is formed in the nature of an annular seat 17 having radial channels 18 formed in its face, while the annular seat 19 formed at the upper end of the lower member has the radial channels 20 formed therein. The valve 21 is in the nature of a disc and has serrations 22 formed in its periphery, the arrangement being such that when oil is forced upwardly through the oil passageway 16 in the lower member 14, this oil initially passes radially out through the channels 20 and thence upwardly through the recesses formed by the serrations 22 and over the upper face of the valve 21 and through the passageway 15 of the upper member 13, and in doing so frees the channels in both the upper and lower members of sediment. The valve is then raised to seat upon the annular seat 17 of the upper member, after which the flow of oil to the passageway in the upper member is limited to that amount flowing through the channels 18 in the annular seat 17. Upon stopping of the mechanism propelling the oil through the regulator the valve will lower and oil may return through the valve to the passageway in the lower member and in doing so also assists in freeing the restricted portions of the passageway of sediment.

In the modification shown in Figure 8, the oil flow regulator is made up in the same manner as that shown in Figures 1, 2 and 3 or Figures 4, 5, 6 and 7, but the valve 23 is thermostatic so that it may occupy the position shown in full lines in Figure 8, at which time the length of the restricted passageways formed by the channels in either the upper face of the valve or the channels in the annular seat of the upper member of the device are the minimum. The valve is so constructed that upon increase of temperature of the oil flowing through the regulator the valve will flex from the position shown in the drawing to assume a straight line position thereby increasing the length of the restricted passageways and in doing so increase the resistance to the flow of oil through the regulator. The sediment collecting in the restricted passageways is removed in the manner set forth in connection with the preceding described forms of the invention.

Figure 9 shows another modification in which the parts of the regulator may be made in accordance with those shown in Figures 1, 2 and 3, or Figures 4, 5, 6 and 7. In this regulator a coil spring 24 is added to positively return the valve to seat upon the annular seat 25 of the member 26 of the regulator having an oil passageway 27 with its end of a greater diameter than the adjacent end of the oil passageway in the other member of the regulator. This spring abuts the valve 28 and the transverse pin 29 extending through the other member of the regulator. With this arrangement it will be seen that oil upon being propelled through the regulator must operate to compress the spring in forcing the valve to its proper operative position. The advantage of this construction over those previously described is that either member of the regulator may be placed uppermost inasmuch as gravity is not relied upon for returning the valve to its initial position.

From the above description it is readily seen that I have provided a construction of liquid flow regulator and more specifically an oil flow regulator having provision for a restricted passageway and having provision for automatically freeing this restricted passageway of sediment.

What I claim as my invention is:

1. In a liquid flow regulator, the combination with a member having a passageway for the liquid, of means for controlling the flow of the liquid through the passageway, including a movable disk adapted to occupy a position relative to the member to form therewith a restricted passageway for the liquid partly on a face of the disk and communicating with the first mentioned passageway, the disk also being adapted to occupy another position relative to the member to expose a side of the restricted passageway to the liquid to free the restricted passageway of sediment which might collect therein.

2. In a liquid flow regulator, the combination with a member having a passageway for the liquid and a seat encircling the passageway, of a movable disk having a channel in its face adapted to cooperate with the seat to form a restricted passageway for the liquid communicating with the first mentioned passageway, the disk being adapted to occupy a position spaced from the seat to expose a side of the channel to the liquid to free the channel of sediment which might collect therein.

3. In a regulator for controlling the flow of liquid, the combination with a member having a passageway for the liquid and a seat encircling the passageway, of an automatically movable valve, adapted to cooperate with the seat to form a restricted passageway for the liquid partly on a face of the valve and communicating with the first mentioned passageway, the valve being adapted to occupy a position spaced from the seat to expose a side of the restricted passageway to the liquid to free the restricted passageway of sediment which might collect therein.

4. In a regulator for controlling the flow of oil, the combination with a member having a passageway for oil, and a seat encircling the passageway, of an automatically operating valve adapted to cooperate with the seat to form a restricted passageway for the oil partly on a face of the valve and communicating with the first mentioned passageway, the valve being axially movable relative to the seat to expose a side of the restricted passageway to the oil, whereby the oil may free the restricted passageway of sediment which might collect therein.

In testimony whereof I affix my signature.

PHELPS M. FREER.